(12) United States Patent
Lee et al.

(10) Patent No.: US 6,996,677 B2
(45) Date of Patent: Feb. 7, 2006

(54) METHOD AND APPARATUS FOR PROTECTING MEMORY STACKS

(75) Inventors: Michael C. Lee, Ottawa (CA); Lawrence Dobranski, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 440 days.

(21) Appl. No.: 10/368,596

(22) Filed: Feb. 20, 2003

(65) Prior Publication Data

US 2004/0103252 A1 May 27, 2004

Related U.S. Application Data

(60) Provisional application No. 60/428,839, filed on Nov. 25, 2002.

(51) Int. Cl.
G06F 12/00 (2006.01)

(52) U.S. Cl. .............. 711/132; 711/154; 711/4; 712/34

(58) Field of Classification Search .............. 713/187, 713/189, 190, 193; 712/242, 34, 35; 711/132, 711/154, 4; 710/56
See application file for complete search history.

(56) References Cited

U.S. PATENT DOCUMENTS

| | | | | |
|---|---|---|---|---|
| 5,107,457 A | * | 4/1992 | Hayes et al. | 711/132 |
| 5,355,459 A | * | 10/1994 | Matsuo et al. | 712/242 |
| 5,835,958 A | * | 11/1998 | Long et al. | 711/170 |
| 6,388,989 B1 | * | 5/2002 | Malhotra | 370/229 |
| 6,618,797 B1 | * | 9/2003 | Dery et al. | 711/170 |
| 6,647,400 B1 | * | 11/2003 | Moran | 707/205 |
| 6,832,302 B1 | * | 12/2004 | Fetzer et al. | 711/170 |
| 6,842,802 B2 | * | 1/2005 | Adams | 710/57 |
| 2003/0065929 A1 | * | 4/2003 | Milliken | 713/189 |
| 2003/0217277 A1 | * | 11/2003 | Narayanan | 713/187 |

OTHER PUBLICATIONS

Fetzer, et al., "Detecting Heap Smashing Attacks Through Fault Containment Wrappers", © IEEE 2001, p. 1–10.*
Forrest et al., "Building Diverse Computer Systems", © 1997 IEEE, p. 67–72.*
Chiueh et al., "RAD: A Compile-Time Solution to Buffer Overflow Attacks", © 2001 IEEE, p. 409–417.*

* cited by examiner

Primary Examiner—Donald Sparks
Assistant Examiner—Brian R. Peugh

(57) ABSTRACT

Method and apparatus for protecting processing elements from buffer overflow attacks are provided. The apparatus includes a memory stack for, upon execution of a jump to subroutine, storing a return address in a first location in a stack memory. A second location separate from the stack memory for storing an address of the first location and a third location separate from the stack memory for storing the return address itself are included. A first comparator upon completion of the subroutine, compares the address stored in the second location to the first location in the stack memory and a first interrupt generator provides an interrupt signal if locations are not the same. A second comparator looks at the return address stored in the third location and the return address stored in the first location in the stack memory and has a second interrupt generator for generating an interrupt signal if addresses are not the same. A further method and apparatus for protecting processing elements from buffer overflow attacks includes a memory stack for, upon execution of a jump to subroutine in a first processor, storing a return address in a first location in a stack memory and a second location separate from the stack memory for storing results for the subroutine operation. Also included is a second processor including routines for data manipulation associated with the subroutine, separate from the first processor and for storing any resultant data in the second location, which is readable by the first processor separate from the stack memory.

15 Claims, 4 Drawing Sheets

METHOD AND APPARATUS FOR PROTECTING MEMORY STACKS

FIELD OF THE INVENTION

The present invention relates to method and apparatus for protecting memory stacks, and is particularly concerned with preventing buffer overflow attacks.

BACKGROUND OF THE INVENTION

There are currently a number of serious security vulnerabilities that are associated with buffer overflow attacks with most existing software. An attacker exploits these existing software vulnerabilities to gain root control of, or denial of use to, a target computer system. A buffer overflow attack relies on the lack of boundary checking in software languages and lack of programmer discipline that allows the interjection and execution of malicious code by an attacker. Buffer overflow exploit rely on corrupting the processing element (microprocessor or microcomputer) software stack so that the malicious code can be executed by the processing element, thereby giving the attacker control of the target computer. Buffer overflow attacks are the dominant mode of hacker attack for existing computer systems.

Normally, when a buffer overflow vulnerability is found, a software vendor will create software patches to fix the particular buffer overflow vulnerability. Applying software patches however is costly, time consuming, and ineffective overall since it always happens after the vulnerability has been discovered and most often has already been exploited.

Buffer overflow attacks have the following characteristics:

- Very widespread vulnerability and dominant mode of attack for computer systems. (e.g. Well publicized distributed denial of service (DdoS) attacks on Yahoo, Ebay and others);
- Attacker gains root control of a target computer system;
- Buffer overflows result from a lack of boundary checking and lack of programmer discipline that allows the interjection and execution of malicious code;
- Relies on corrupting the processor stack so that the malicious code can be executed, thereby giving the attacker control of the target computer.

How a buffer overflow attack works is described with reference to FIGS. 1a–1d.

Referring to FIG. 1a, there is illustrated how a normal processing element execution occurs for a stack 10, with a stack pointer (SP) 12 pointing to the top of the used stack in an external memory for storing data 14. The stack is typically either a static random access memory (SRAM) or a dynamic random access memory (DRAM) that normally resides external to a processing element using it.

Referring to FIG. 1b, when a subroutine is called via a jump to subroutine command (JSR), the processor pushes the current program execution address onto the stack to be used as the return address 16 for when the subroutine has completed executing. The stack pointer 12 is incremented to point to the top of the used stack.

Referring to FIG. 1c, the called subroutine executes, and gets any input/output variables requested by the subroutine and places these on the stack, as indicated at 18 again incrementing the stack pointer to point to the top of the used stack. The subroutine most often gets input/output variables by means of a string copy command [strcpy( )]. Once the subroutine has executed, a return command (RET) is issued. Execution then continues normally from the return address that was previously pushed onto the stack when the subroutine was originally called. The previously pushed return address is placed into the program counter to allow execution to continue at the correct place after the subroutine has run.

Referring to FIG. 1d, there is illustrated a typical stack overflow attack. If the called subroutine does not properly check the quantity of data being placed on the stack (most often it does not), the data can overwrite the original return address, as indicated by 20. When the return command (RET) is now called, program execution jumps to some location other than intended location caused by "New Return Address." During a buffer overflow attack, an attacker submits data to the program, which are actually malicious software instructions, with the last piece of data coordinated to overwrite the original return address with a pointer to a location in the stack itself, as indicated by 22. These data are submitted in many ways depending on the particular program and buffer overflow attack. One typical example is on a web page where the user is requested to input data into a form. When the return command (RET) is now called, program execution starts from the instruction the attacker has placed into the stack, e.g. "Instruction 1" and the attacker now has complete control over the target computer.

SUMMARY OF THE INVENTION

An object of the present invention is to provide an improved method and apparatus for protecting memory stacks from buffer overflow attacks.

In accordance with an aspect of the present invention there is provided a method and apparatus for protecting processing elements from buffer overflow attacks are provided. The apparatus includes a memory stack for, upon execution of a jump to subroutine, storing a return address in a first location in a stack memory. A second location separate from the stack memory for storing an address of the first location and a third location separate from the stack memory for storing the return address itself are included. A first comparator upon completion of the subroutine, compares the address stored in the second location to the first location in the stack memory and a first interrupt generator provides an interrupt signal if locations are not the same. A second comparator looks at the return address stored in the third location and the return address stored in the first location in the stack memory and has a second interrupt generator for generating an interrupt signal if addresses are not the same.

In accordance with an aspect of the present invention there is provided a further method and apparatus for protecting processing elements from buffer overflow attacks includes a memory stack for, upon execution of a jump to subroutine in a first processor, storing a return address in a first location in a stack memory and a second location separate from the stack memory for storing results for the subroutine operation. Also included is a second processor including routines for data manipulation associated with the subroutine, separate from the first processor and for storing any resultant data in the second location, which is readable by the first processor separate from the stack memory.

The solutions proposed in the present invention prevent buffer overflow attacks from occurring by preventing stack corruption from occurring directly at the hardware level.

The methods proposed in the present invention prevents buffer overflow vulnerabilities from occurring in the first place, and as such is a much better solution than applying software patches after the fact.

An advantage of the present invention is buffer overflow attacks are prevented at a fundamental processing element level. Software programmers do not require knowledge of buffer overflow attack methodology and protection provided is fully transparent to the programmer. Neither training nor change in behavior is required on the programmer's part. The present invention is compatible with existing compilers and development environments, and no modifications are required to software languages. Since this invention prevents buffer overflow attacks right at the fundamental hardware level, future buffer overflow attacks will be prevented as well as known existing exploits.

BRIEF DESCRIPTION OF THE DRAWINGS

The present invention will be further understood from the following detailed description with reference to the drawings in which.

DETAILED DESCRIPTION OF THE PREFERRED EMBODIMENT

Figure 2:
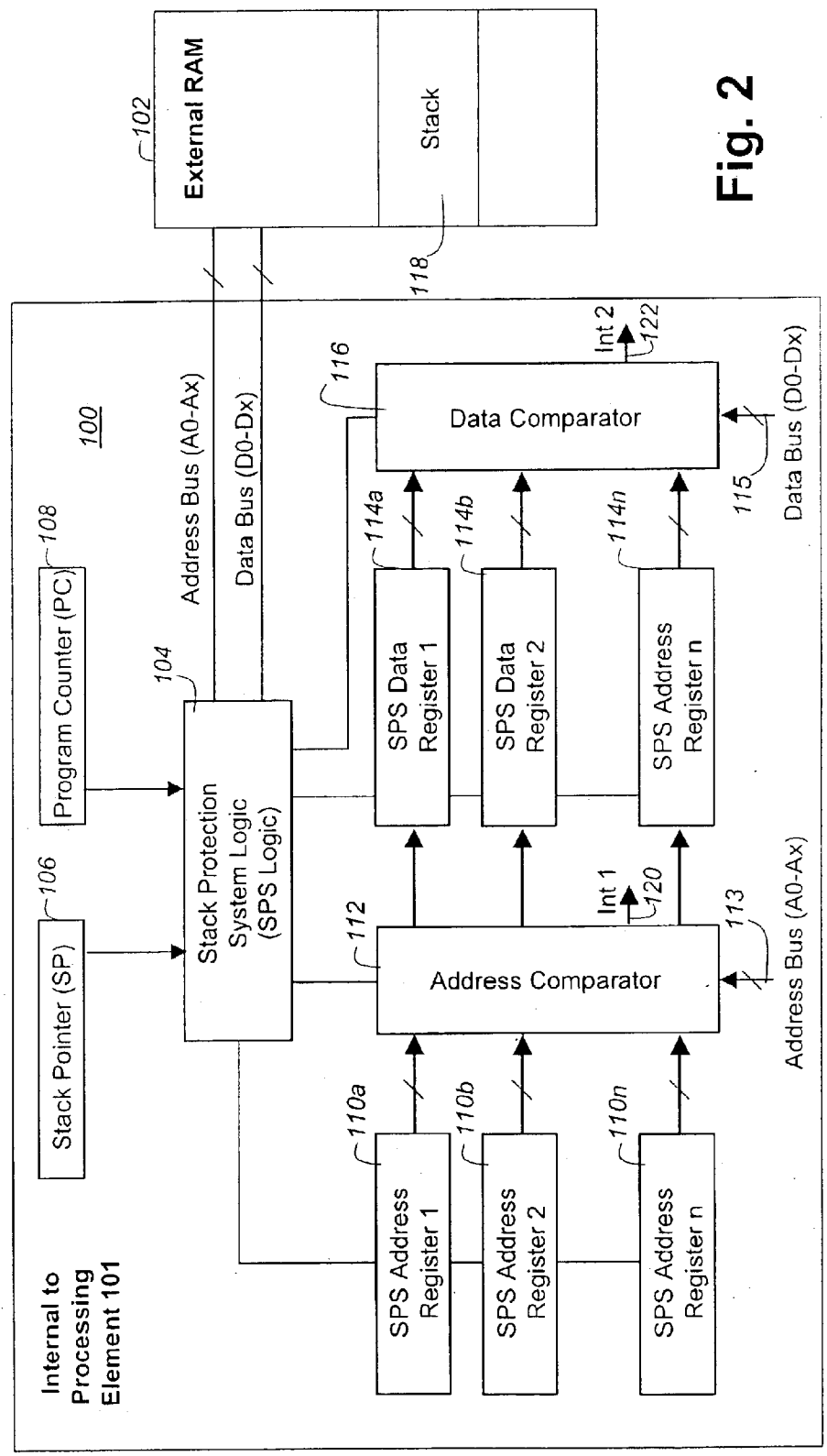
FIG. 2 illustrates a stack protection subsystem in accordance with an embodiment of the present invention.

Referring to FIG. 2 there is illustrated a stack protection subsystem in accordance with an embodiment of the present invention. The stack protection subsystem 100 resides on a processing element and is coupled to an external random access memory (RAM) 102. The stack protection subsystem 100 includes a stack protection logic (SPS Logic) 104 having inputs for a stack pointer register (SP) 106 and a program counter (PC) 108. The stack protection subsystem 100 also includes a plurality of SPS address registers 110a–110n, an address comparator 112 having a corresponding plurality of inputs and an address bus input 113, a plurality of SPS data registers 114a–114n, and a data comparator 116 having a corresponding plurality of inputs and an data bus input 115. The registers 110 and 114 are hardware registers that may be implemented as latches, flip-flops or other similar devices within the processing element. In contrast, the external memory, which contains a stack 118, comprises static or dynamic random access memory that does not reside within the processing element.

Figure 1:
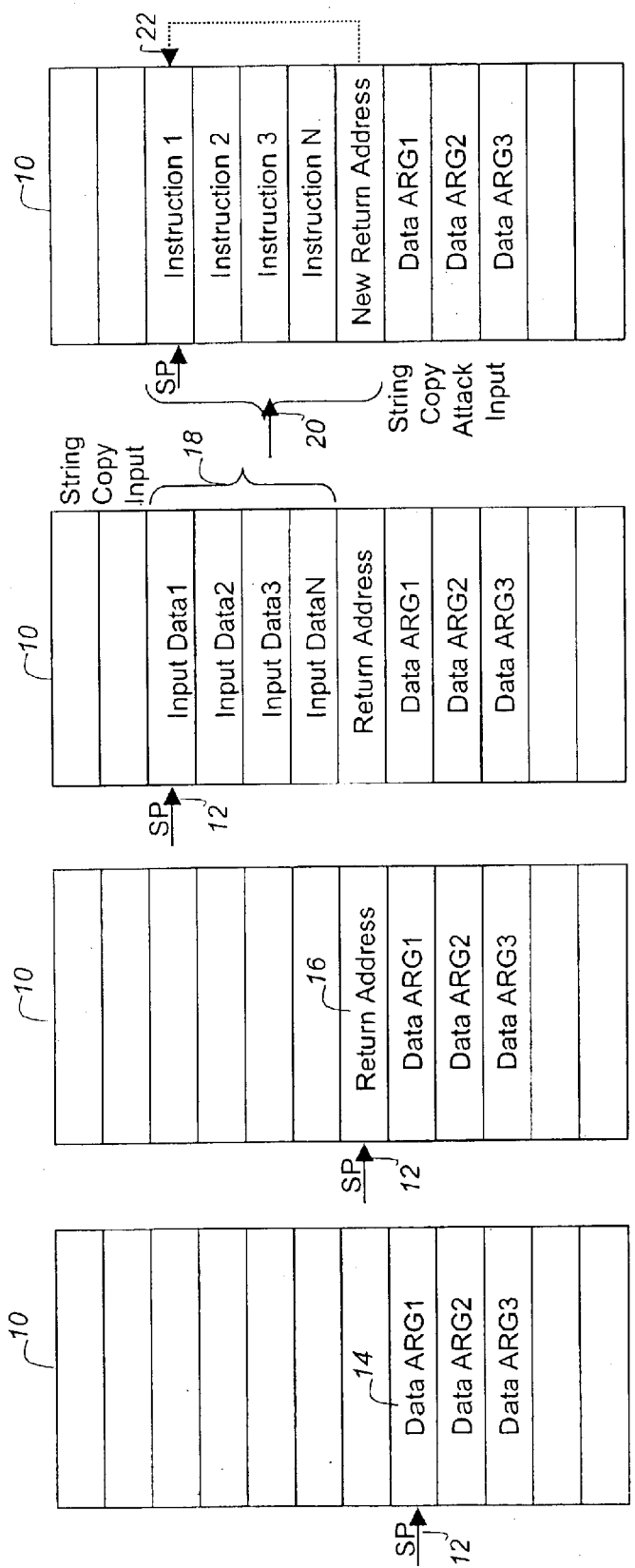
FIGS. 1a–1d illustrate how a processing element execution occurs for a stack and how typical buffer overflow attacks are effected.

In operation, under normal circumstances, whenever a subroutine is called, the processing element executes a jump to subroutine (JSR) instruction, or another similar instruction depending upon the particular processing element involved. This triggers the placement of the contents (data bits) of the program counter (PC) 108 onto the external stack 118 to be used as the future return location after subroutine execution as illustrated in FIG. 1b. The stack pointer register (SP) 106 points to the external memory location where the top of the stack is located. As part of the normal operation of the jump to subroutine (JSR) instruction, the internal circuitry of the microprocessor loads the program counter (108) with the address of the subroutine so that the program can continue executing with the subroutine instructions that are stored. (That is, the program counter points to the memory location where the next instructions are located.) The program counter 108 is subsequently loaded with the address of the subroutine, and subroutine execution commences.

With the stack protection subsystem, whenever a subroutine is called, the content of program counter (PC) is placed in a stack protection system data register (SPS data register) 114a–n as well as being placed in the normal fashion into the external memory stack 118. The particular address in the external stack 118 where the contents of the program counter is stored is also loaded into a stack protection system address register (SPS address register) 110a–n associated with each particular SPS data register. For example, a program counter content stored in SPS data register 114b has its corresponding external stack address stored in SPS address register 110b. In this fashion, whenever the content of the program counter is loaded to external stack memory 118, the address of this stack location is recorded in the SPS address register and the actual data placed into the stack is recorded in the SPS data register, all being internal storage registers within the processing element. Consequently, no matter what happens to the external stack memory, the addresses and contents of particular stack memory locations associated with subroutine return addresses are stored safely within the processor element itself.

As discussed previously, after a particular subroutine has executed the return address is retrieved from the external memory stack 118 and loaded into the program counter (PC) register 108 within the processing element to allow execution to continue. If the stack has been corrupted by a buffer overflow attack, the execution address will not be correct and malicious instructions can be run. With the new stack protection system however, whenever a return instruction is executed by the processing element, or whenever the program counter (PC) register 108 is loaded with data from an external stack location, a new series of events occur:

The stack protection system logic (SPS logic) 104 detects that the PC register 108 is being requested to be loaded with data from an external stack location. Either a return instruction (RET) has been executed or an instruction attempts to load the PC with data referenced by the stack pointer (SP).

1. The SPS logic 104 enables an address comparator circuit 112 to compare the address of the external stack location, which is being accessed, with those addresses previously stored in the SPS address registers 110a–n.

2. The address comparator logic 104 should find a match with those addresses previously stored in the SPS address registers 110a–n. If no match is found there is an error in program execution and an interrupt exception is generated to the processor element, int 1 at an output 120. Note that this interrupt would indicate an error in program execution since the correct addresses are not stored properly and this interrupt is not expected to occur often.

3. When the address comparator logic 104 finds a match with an address stored in the SPS address registers, for example SPS address register 110b, an output enable signal is generated to allow the data stored in the associated SPS data register 114b to be placed at the input of the data comparator logic 116.

4. The data comparator logic 116 compares the data stored in the particular SPS data register 114b with that on the data bus 115, i.e. data contained in the external memory stack. If the data on the data bus 115 is the same as the data stored in the SPS data register 114b, then the instruction for moving data to the program counter (PC) 108 is allowed to complete. If however, the data comparator indicates different data, the instruction to move data to the PC register 108 is aborted, and an interrupt exception is generated to the processing element, int 2 at an output 122. Note that this interrupt would indicate stack corruption most likely due to buffer overflow, and this interrupt will occur during a buffer overflow attack.

An alternate method would be to allow the SPS data register place the correct data into the PC and continue execution, however it is better to generate an exception since the extent of the stack corruption is not known.

In this manner, any time data are attempted to be moved into the program counter register 108 from external stack memory 118, the integrity of that data is checked by the stack protection system 100 before the data is allowed to be moved and change program execution.

Please note that there are multiple SPS address registers 110a–n and SPS data registers 114a–n, as indicated by the range a–n. These are required as subroutines can be nested within other subroutines, and thus multiple return addresses are placed and retrieved from the external stack memory. The exact numbers of SPS address registers and SPS data registers required depends upon the particular processing element and software language used. Use of greater than 100 SPS address registers and SPS data registers is recommended, and with modern small geometry integrated circuits this amount of hardware is very small and negligible compared to all the other processing element circuitry. For example, even if greater than 1000 SPS registers are provided, the amount of hardware would still be relatively small.

All aspects of this invention can be implemented via new hardware added to the processing element such as a microprocessor or microcomputer itself, or through the use of new hardware which works in conjunction with an existing processing element such as a microprocessor or microcomputer. Various portions of this invention can be implemented in processing element micro code or software instead of, or in conjunction with, a hardware implementation.

Figure 3:
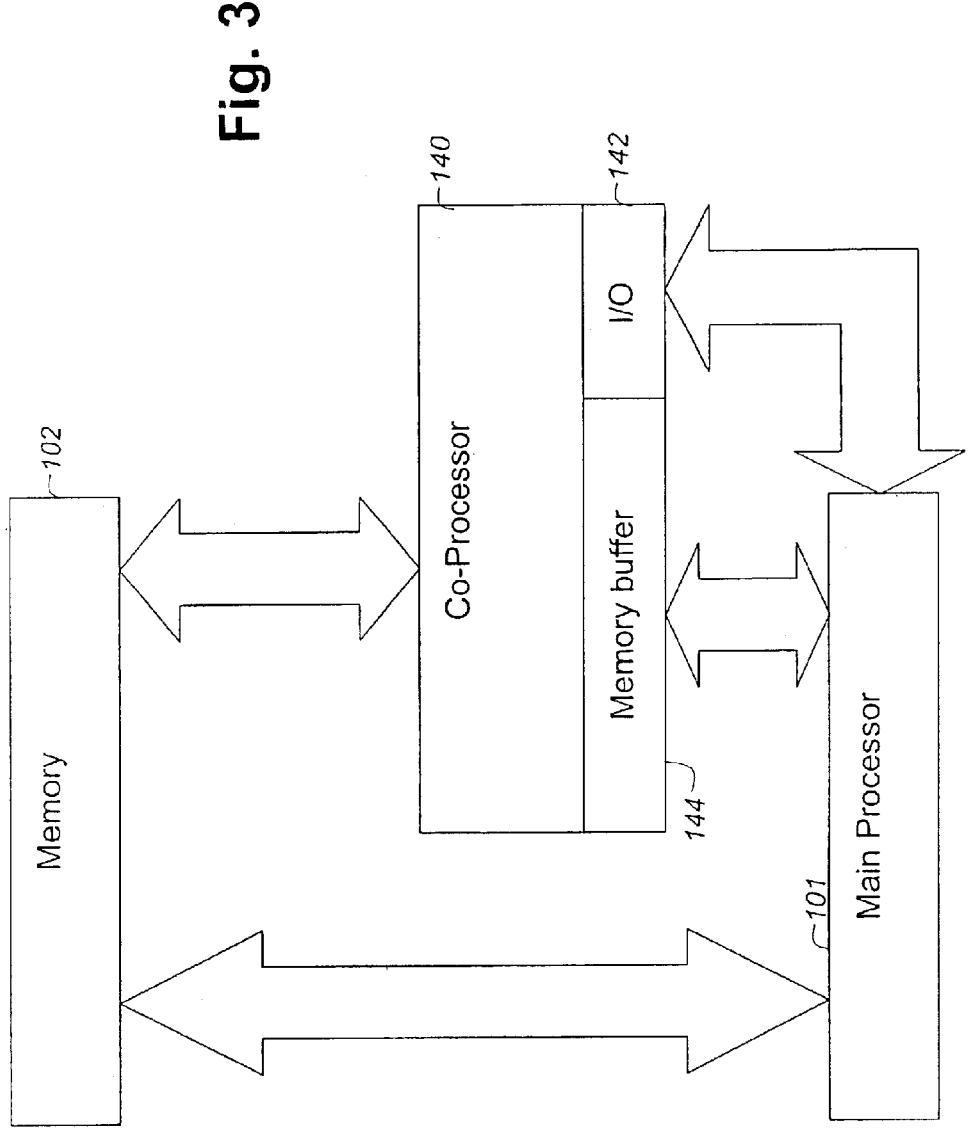
FIG. 3 illustrates a stack protection subsystem in accordance with a second embodiment of the present invention.

Referring to FIG. 3 there is illustrated a stack protection subsystem in accordance with a second embodiment of the present invention. The hardware stack protection subsystem described with regard to FIG. 2 is integrated internally to the processing element. In a second embodiment of the present invention, buffer overflow protection is provided in a coprocessor element 140, separate from the main processor, in order that the buffer overflow protection may be provided with existing processing elements. The co-processor 140 includes an input/output (I/O) 142 and a buffer memory 144. The co-processor 140 implements the stack protection subsystem as an element separate from main processing elements. The co-processor 140 prevents stack corruption, which occurs during buffer overflow attacks by handling, on behalf of the main processor 101, all buffer and string operations from the main processing element. The co-processor utilizes additional registers, memory, other hardware functions, and an associated software library to prevent stack corruption that occurs during a buffer overflow in an unprotected processing element.

In addition to warning the main processing element by generating an exception interrupt when a buffer overflow becomes immanent, the coprocessor returns properly terminated data to the main processor, within the specified bounds of the calling architecture. The co-processor physically prevents a buffer overrun from reaching the main processing element thereby preventing stack corruption from occurring and thus a buffer overflow attack from being possible. This stack protection co-processor does not guarantee that legitimate data will be input to a program; however it does prevent attempts to input malicious data in a manner that would cause a buffer overflow and subsequent access to system resources. The coprocessor does guarantee that all string data processed by the main processor will be properly formatted and terminated for the invoking routine.

The buffer overflow protection co-processor 140 comprises a series of hardware implemented string processing functions. These generic functions perform most common string manipulation, and data input procedures. These functions are created by hardware such as latches, flip-flops or other such hardware within the co-processing element itself and are not contained in memory external to either the main processor 101 or the coprocessor 140. A suitably size buffer memory 144 is resident within the co-processor 140 itself.

The buffer overflow protection co-processor 140 does not allow external input data to access the main processors' stack in main memory (not shown in FIG. 3) until after it has been processed and bounded. The coprocessor 140 provides finite length strings back to the calling main processor routine from a separate memory array 144 that is not contained on the stack but is contained in the coprocessor 140. In this way the buffer overflow protection co-processor prevents the return address for subroutines from becoming corrupted.

Figure 4:
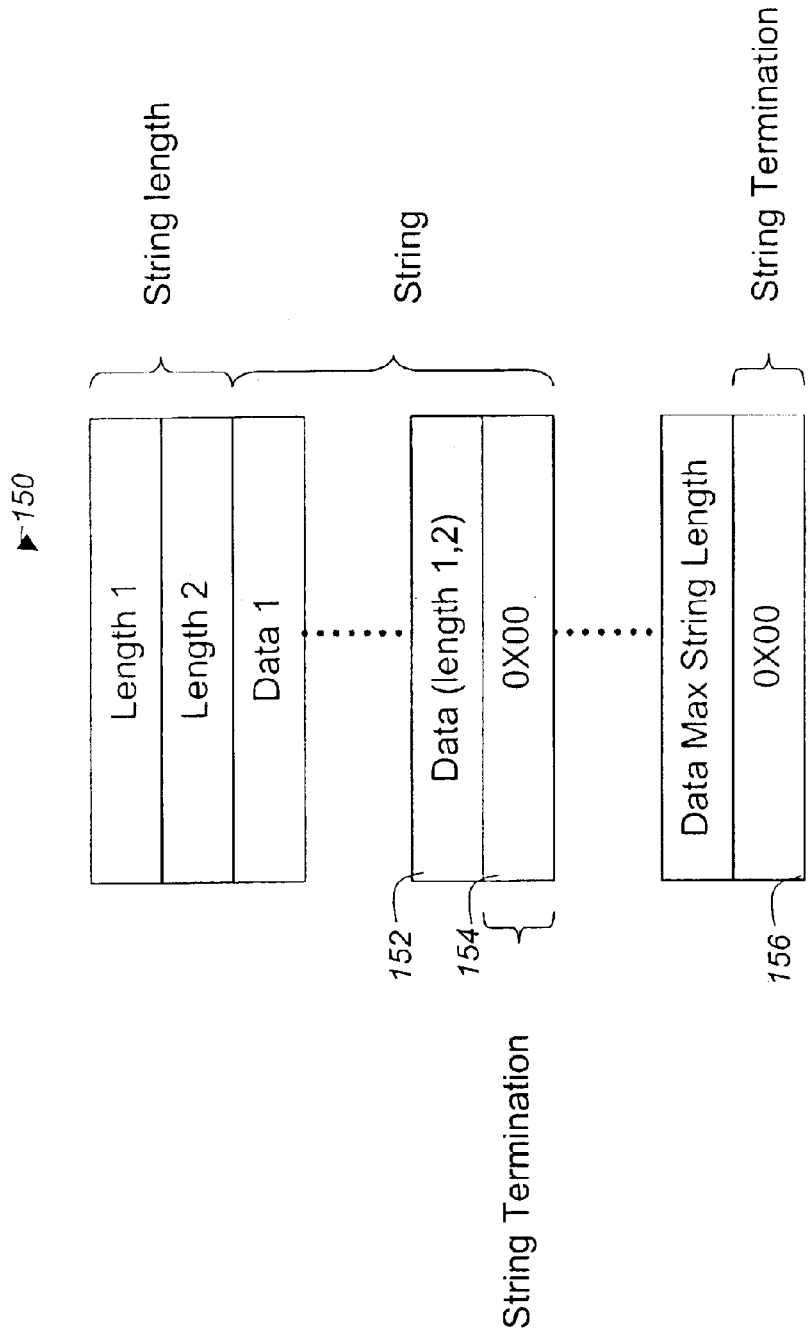
FIG. 4 illustrates a functional block diagram operation of the buffer overflow protection co-processor of FIG. 3.

Referring to FIG. 4, there is illustrated in a functional block diagram operation of the buffer overflow protection co-processor of FIG. 3. Advantageously, at the time of software routine development, no change is necessary in the development language. The native language definitions for routines that perform string manipulation and data input procedures are used.

The routines that perform these native language routines for string manipulation and data input procedures are provided as precompiled programming elements called libraries. To use the functions of the buffer overflow co-processor, a replacement precompiled programming library is provided that replaces the precompiled programming library provided by the programming language manufacture. In this way instead of the program using the standard string manipulation and input procedures, the program uses string manipulation and input procedures that make use of the buffer overflow protection co-processor.

The buffer overflow protection co-processor uses finite length strings 150. The lengths of these strings are defined as the first two bytes of the data type 152, as shown in FIG. 4. The end of a string is indicated by the null value (0X00 hexadecimal) being stored in a memory location 154 after the string. The coprocessor 140 ensures that the null value (0X00 hexadecimal) is stored at the location corresponding to the string length value. To ensure compatibility with all programming languages and to add maximum security, a 0X00 is also placed by the coprocessor 140 into the (maximum string length–1) location 156, which ensures that any string is definitely be terminated.

The buffer overflow protection processor 140 is invoked by software in the following manner:

1. A routine calls a string processing or buffer manipulation procedure or function (e.g., string copy or "strcpy");
2. The parameters associated with the procedure or function (e.g. a return address) are placed on the main processor stack 118 in memory 102 and a JSR (jump to subroutine). Operation Code is executed to transfer control to the overflow protection co-processor interface routines;

3. The buffer overflow protection co-processor 140 begins to process the string manipulation procedure or data input function;

4. The buffer overflow protection co-processor 140 allocates its internal memory for the results of the operation;

5. The buffer overflow protection co-processor 140 converts the called string or buffer parameters into its internal string/buffer representation 150, with finite, defined length;

6. The buffer overflow protection co-processor 140 performs the desired operation;

7. The buffer overflow protection co-processor 140 places the results in its internal memory, which are accessible to the main processor;

8. The controlling software now performs a RTS (return from subroutine), returning control to the calling software on the main processor 101 that then retrieves the return address from its stack 118;

Since the data is never placed on the main memory stack 118, but rather is handled by the coprocessor 140, the data is bounded in length. The main memory stack data cannot be corrupted and a buffer overflow attack thus is avoided.

Thus, the co-processor acts as an intelligent stack memory, which enforces rules for what is entered in the "stack", thereby preventing overflow attacks. The stack co-processor allocates its internal memory to take the place of the external stack memory, but only for the string and buffer manipulation commands, which are associated with buffer overflow attacks. The storing of return addresses and other information still occurs on the external stack 118 contained in memory 102. The coprocessor 140 takes over when string copy commands, buffer manipulation commands, or other risky data input commands are issued, thereby preventing the external stack 118 from being corrupted by these commands in a buffer overflow attack scenario.

What is claimed is:

1. A method of protecting processing elements from buffer overflow attacks, the method comprising the steps of:

upon execution of a jump to subroutine, storing a return address in a first location in a stack memory;

storing an address of the first location in a second location separate from the stack memory;

storing the return address itself in a third location separate from the stack memory;

upon completion of the subroutine, comparing the address stored in the second location to the first location in the stack memory;

if equal, comparing the return address stored in the third location to the return address stored in the first location in the stack memory; and if equal, returning to the return address.

2. A method as claimed in claim 1 wherein if the address stored in the second location and the first location address in the stack memory are not equal, generating a first interrupt signal to the processing element.

3. A method as claimed in claim 1 wherein if the return address stored in the third location and contents of the first location in the stack memory are not equal, generating a second interrupt signal to the processing element.

4. Apparatus for protecting processing elements from buffer overflow attacks, comprising:

a memory stack for, upon execution of a jump to subroutine, storing a return address in a first location in a stack memory;

a second location separate from the stack memory for storing an address of the first location;

a third location separate from the stack memory for storing the return address itself;

a first comparator for, upon completion of the subroutine, comparing the address stored in the second location to the first location in the stack memory and having a first interrupt generator for generating an interrupt signal if locations are not the same; and a second comparator for comparing the return address stored in the third location to the return address stored in the first location in the stack memory and having a second interrupt generator for generating an interrupt signal if addresses are not the same.

5. A method of protecting processing elements from buffer overflow attacks, the method comprising the steps of:

upon execution of a jump to subroutine, storing a return address in a first location in a stack memory;

storing the return address itself in a second location separate from the stack memory;

comparing the return address stored in the second location to the return address stored in the first location in the stack memory; and if equal, returning to the return address.

6. A method as claimed in claim 5 wherein if the address stored in the second location and the first location in the stack memory are not equal, generating an interrupt signal to the processing element.

7. Apparatus for protecting processing elements from buffer overflow attacks, comprising:

a memory stack for, upon execution of a jump to subroutine, storing a return address in a first location in a stack memory;

a second location separate from the stack memory for storing the return address itself;

a comparator for comparing the return address stored in the second location to the return address stored in the first location in the stack memory; and an interrupt generator for generating an interrupt signal if addresses are not the same.

8. A method of protecting processing elements from buffer overflow attacks, the method comprising the steps of:

upon execution of a jump to subroutine in a first processor, storing a return address in a first location in a stack memory;

processing a data manipulation associated with the subroutine in a second processor, separate from the main processor and storing any resultant data in a second location, which is readable by the first processor separate from the stack memory;

upon completion of the subroutine, returning control to the first processor for reading of the return address stored in the first location in the stack memory.

9. A method as claimed in claim 8 wherein the data manipulation includes one of a string processing, buffer manipulation procedure, and buffer manipulation function.

10. A method as claimed in claim 9 wherein the string processing is a string copy.

11. A method as claimed in claim 9 wherein parameters associated with the procedure or function are placed on the stack memory of the first processor stack.

12. A method as claimed in claim 8 wherein the step of processing is initiated by executing an operation code to transfer control to interface routines of the second processor.

13. A method as claimed in claim 8 wherein the step of processing includes allocating internal memory in the second processor for storing results.

14. A method as claimed in claim 13 wherein the step of converting a called string or buffer parameters into an internal string/buffer representation with finite, defined length.

15. Apparatus for protecting processing elements from buffer overflow attacks, comprising:

- a memory stack for, upon execution of a jump to subroutine in a first processor, storing a return address in a first location in a stack memory;
- a second location separate from the stack memory for storing results for the subroutine operation;
- a second processor including routines for data manipulation associated with the subroutine, separate from the first processor and for storing any resultant data in the second location, which is readable by the first processor separate from the stack memory.

* * * * *